(12) United States Patent
Rothchiller et al.

(10) Patent No.: US 7,003,722 B2
(45) Date of Patent: Feb. 21, 2006

(54) METHOD AND SYSTEM FOR CONVERTING A SCHEMA-BASED HIERARCHICAL DATA STRUCTURE INTO A FLAT DATA STRUCTURE

(75) Inventors: Chad Rothchiller, Edmonds, WA (US); Michael J. McCormack, Snohomish, WA (US); Ramakrishnan Natarajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 10/376,442

(22) Filed: Feb. 28, 2003

(65) Prior Publication Data

US 2004/0172590 A1 Sep. 2, 2004

(51) Int. Cl.
*G06F 19/00* (2006.01)
(52) U.S. Cl. ............... 715/513; 715/503; 715/517; 715/522; 715/523
(58) Field of Classification Search ........... 715/513, 715/523, 854; 707/102, 103
See application file for complete search history.

(56) References Cited

U.S. PATENT DOCUMENTS

| | | | | |
|---|---|---|---|---|
| 6,366,299 B1 * | 4/2002 | Lanning et al. | ............ | 715/738 |
| 6,418,446 B1 | 7/2002 | Lection et al. | ............ | 707/103 |
| 6,476,833 B1 | 11/2002 | Moshfeghi | ............ | 345/854 |
| 6,480,860 B1 | 11/2002 | Monday | ............ | 707/102 |
| 6,480,865 B1 | 11/2002 | Lee et al. | ............ | 707/523 |
| 6,487,566 B1 | 11/2002 | Sundaresan | ............ | 707/513 |
| 6,502,101 B1 * | 12/2002 | Verprauskus et al. | ....... | 707/101 |
| 6,502,112 B1 | 12/2002 | Baisley | ............ | 707/513 |
| 6,631,497 B1 * | 10/2003 | Jamshidi et al. | ............ | 715/514 |
| 6,868,423 B1 * | 3/2005 | Ohta et al. | ............ | 707/102 |
| 2002/0129054 A1 * | 9/2002 | Ferguson et al. | ............ | 707/503 |
| 2003/0172196 A1 * | 9/2003 | Hejlsberg et al. | ............ | 709/328 |
| 2004/0025114 A1 * | 2/2004 | Hiebert | ............ | 715/513 |
| 2004/0054675 A1 * | 3/2004 | Li | ............ | 707/100 |

FOREIGN PATENT DOCUMENTS

WO WO 200182133 A2 * 11/2001

OTHER PUBLICATIONS

Connolly, P.J., Cornering the Office, Nov. 27, 2002, Info-World.*
Udell, Jon, Office 11 packs XML, Feb. 24, 2003, Info-World.*

(Continued)

*Primary Examiner*—Stephen Hong
*Assistant Examiner*—N Hillery
(74) *Attorney, Agent, or Firm*—Merchant & Gould

(57) ABSTRACT

A method and system are provided for converting a hierarchical data structure into a flat data structure based on a schema. The format of the hierarchical data structure may be XML. A hierarchical data structure conforming to a schema is loaded into an application program. The data structure includes elements and attributes linked together in a parent-child relationship. The schema defines the hierarchical relationships between the elements and attributes in the hierarchical data structure. After the hierarchical data structure conforming to the schema has been loaded, a plurality of layout rules is applied to the hierarchical data based on the schema to create a flat data structure. The layout rules determine how the hierarchical data will be inserted in the flat data structure. The layout rules may be applied by identifying properties in the schema which identify occurrence requirements for elements defined in the schema. After the layout rules have been applied to the hierarchical data, the hierarchical data is rendered into a spreadsheet by inserting the data in rows and columns.

26 Claims, 5 Drawing Sheets

OTHER PUBLICATIONS

"Integrating with External Systems: iPlanet™ Unified Development Server", Sun Microsystems, Inc., Ver. 5.0, Aug. 2001, pp. 127-156.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRosa, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp . . ., Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw . . ., Microsoft Corporation, 1999-2001, pp. 1.

"BizTalk Server 2002 Compiling Data", http://msdn.microsoft.com/library/en-us/bts_2002/htm/lat_xmltools_map_concept_drgl.a . . ., Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a . . ., Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as . . ., Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21 vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

"Integrated Development Environment (IDE)", http://web.archive.org/web/20020602032242/http://altova.com/products_ide.html, Jun. 2002, pp. 1-2.

"Altova markup your mind!", http://web.archive.org/web/20021204211721/http://altova.com/products_ide.html, Dec. 2002, pp. 1-3.

"Arbortext and Accessibility", http://web.archive.org/web/20021219133536/www.arbortext.com/html/accessibility.html, Dec. 2002, pp. 1-5.

"XML Compliance, 100% Pure XML", http:web.archive.org/web/20021209185855/www.arbortext.com/html/xml_compliance, Dec. 2002, pp. 1-3.

"Schemas", http://web.archive.org/web/20021221023148/www.arbortext.com/html/schemas.html, Dec. 2002, pp. 1-3.

"Arbortext's Support for XSL-FO", http://web.archive.org/web/20021221021632/www.arbortext.com/html/xsl-fo.html. Dec. 2002, pp. 1-4.

"Corel XMetal[4], Making XML Content Creation Easy", http://web.archive.org/web/20031118215158/www.corel.com/servlet/Satellite?pagename, Nov. 2003, pp. 1-2.

"Corel XMetal 4 and Interwoven TeamXML", http://web.archive.org/web/20030807211225/www.corel.com/futuretense_cs/ccurl/corel+xml+4+and +interwoven+team-xml.pdf, Aug. 2003, pp. 1-2.

"The Corel-XyEnterprise XML Solution", http://web.archive.org/web/20030807154355/www.corel.com/futuretense_cs/ccurl/corel+and +XY+enterprise+XML+solution.pdf, Aug. 2003, pp. 1-2.

* cited by examiner

METHOD AND SYSTEM FOR CONVERTING A SCHEMA-BASED HIERARCHICAL DATA STRUCTURE INTO A FLAT DATA STRUCTURE

TECHNICAL FIELD

The present invention relates generally to the conversion of highly hierarchical data structures into non-hierarchical (or flat) data structures. More particularly, the present invention relates to receiving input data associated with a schema in a standard format and converting it into a flat table data structure based on the schema.

BACKGROUND OF THE INVENTION

Historically, computer systems and databases have contained data in incompatible formats. As the organizations utilizing these systems and databases became more automated and computerized, the need to share data over computer networks, such as the Internet, became more and more prevalent. Due to this need, standard formats for the sharing of data were developed.

One such standard format developed is Extensible Markup Language ("XML"). XML is a very hierarchical data format, which includes a multitude of data structures having parent-child relationships. In the XML data format, the children of each parent may have further children, which in turn may have still further children, and so on. Due to the advent of this standard data format, many computer users have converted the aforementioned databases to the standard XML data format. The XML format also allows computer users to tailor their data to specific documents using schemas. Schemas provide mechanisms to define and describe the structure, content, and to some extent semantics of XML documents.

Along with the advent of the personal computer on the modern business landscape came many useful application programs including those utilizing electronic spreadsheets. Electronic spreadsheets typically operate on data contained in a matrix of cells comprising columns and rows. Generally, this data format is contained in a single table and is a very flat data structure in that the data is not maintained in hierarchical data structure utilized by XML.

With the ease of availability of the personal computer, many users have become proficient in their use and more specifically, in using electronic spreadsheet application programs. While electronic spreadsheets offer may advantages over prior conventional means, they also utilize a flat data structure. With huge amounts of data stored in hierarchical formats such as XML, the electronic spreadsheet with its flat data structure had no means to access this wealth of data, thus a means for accessing it with a spreadsheet has become desirable. While there are programs currently capable of converting XML formatted data into a spreadsheet, current programs fail to take into account the data relationships defined in schemas associated with hierarchical formatted documents. As a result, the display of hierarchical data contained in a document in a spreadsheet using current programs may be vastly different than the display intended by the author of the document.

It is with respect to these considerations and others that the present invention has been made.

SUMMARY OF THE INVENTION

In accordance with the present invention, the above and other problems are solved by a method and system for converting a hierarchical data structure into a flat data structure, based on a schema associated with the hierarchical data structure, suitable for use in electronic spreadsheet tables.

In accordance with one aspect of the present invention, a method and system are provided for converting a hierarchical data structure into a flat data structure based on a schema. The format of the hierarchical data structure may be XML.

First, the hierarchical data structure conforming to a schema is loaded into an application program. The data structure includes elements and attributes linked together in a parent-child relationship. The schema defines the hierarchical relationships between the elements and attributes in the hierarchical data structure.

Next, a plurality of layout rules is applied to the hierarchical data based on the schema. The layout rules determine how the hierarchical data will be inserted in the resulting flat data structure. The layout rules may be applied by identifying properties in the schema which identify occurrence requirements for elements defined in the schema. These properties may include a specifying the order in which elements occur in the hierarchical data and the number of times each element may occur. Once the properties have been identified, the layout rules are applied to the hierarchical data based on the identified properties. The layout rules may also be applied based on the type of elements defined in the schema. These element types may include attributes, ancestor elements, and sibling elements.

Finally, the layout rules are applied to the hierarchical data to create a flat data structure and the flat data structure is then rendered into the spreadsheet by inserting the data in rows and columns.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
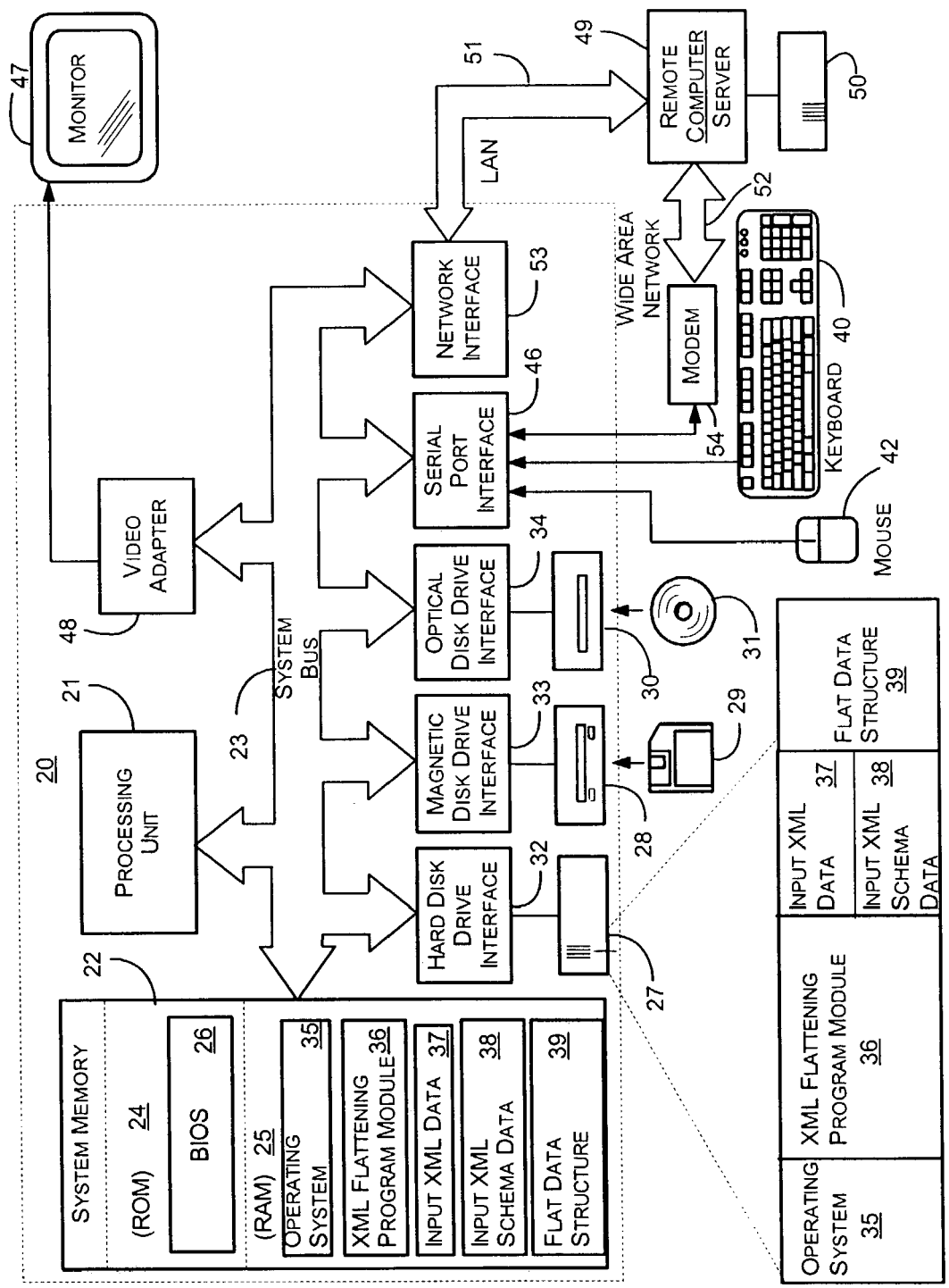
FIG. 1 is a block diagram of a computer system that provides the illustrative operating environment for the present invention.

The present invention is directed to a method and system for flattening input XML data based on a schema associated with the data. In one embodiment, the present invention is incorporated into the "OFFICE" suite of application programs that is marketed by Microsoft Corporation of Redmond, Wash. Briefly described, the invention provides for receiving data formatted in a hierarchical data structure. An example of such a format could include XML, however those skilled in the art will appreciate that many other database structures are highly hierarchical.

In the following detailed description, references are made to the accompanying drawings that form a part hereof, and in which are shown by way of illustration specific embodiments or examples. Referring now to the drawings, in which like numerals represent like elements through the several figures, aspects of the present invention and the illustrative operating environment will be described.

Referring now to FIG. 1, an illustrative operating environment for implementing an illustrative embodiment of the present invention is shown. Within the illustrative operating environment, the present invention may operate to facilitate the flattening of an XML data structure conforming to a schema into a flat data structure based on the schema. However, those skilled in the art should appreciate that the invention may be practiced in any type of computer operating environment such as hand-held devices, multiprocessor systems, microprocessor-based or programmable consumer electronics, minicomputers, mainframe computers, and the like. The invention may also be practiced in distributed computing environments where tasks are performed by remote processing devices.

The illustrative embodiment of the present invention will be described in the general context of a XML flattening program module 36 which receives an input XML schema data 38 and data from input XML data 37 and converts the data into a flat data structure 39 based on the schema data. The flat data structure 39 may be inserted by a spreadsheet in the application program. Those skilled in the art will recognize that the invention may be implemented in combination with various other program modules (not shown). Generally, program modules include routines, programs, components, data structures, etc., that perform particular tasks or implement particular abstract data types. Moreover, those skilled in the art will appreciate that the invention may be practiced with computer system configurations other than the one shown, that are linked through a communications network. In a distributed computing environment, program modules may be located in both local and remote memory storage devices.

An illustrative operating environment 10 for implementing the invention includes a conventional personal computer system 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, an XML flattening program module 36, input XML data 37, input XML schema data 38, a flat data structure 39, and other program modules (not shown).

A user may enter commands and information into the personal computer system 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer system 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer system 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are illustrative and other means of establishing a communications link between the computers may be used. It will be further be appreciated that the invention could equivalently be implemented on host or server computer systems other than personal computer systems, and could equivalently be transmitted to the host computer system by means other than a CD-ROM, for example, by way of the network interface 53.

The present invention may be implemented within a dynamic link library (DLL). Once example of such a DLL is the MSO.DLL provided in the "OFFICE" suite of application programs marketed by the Microsoft Corporation of Redmond Wash. The DLL contains a library of executable functions that may be accessed by an application program by creating either a static or dynamic link to the DLL. A static link remains constant during program execution while a dynamic link is created by the program as needed.

Figure 2:
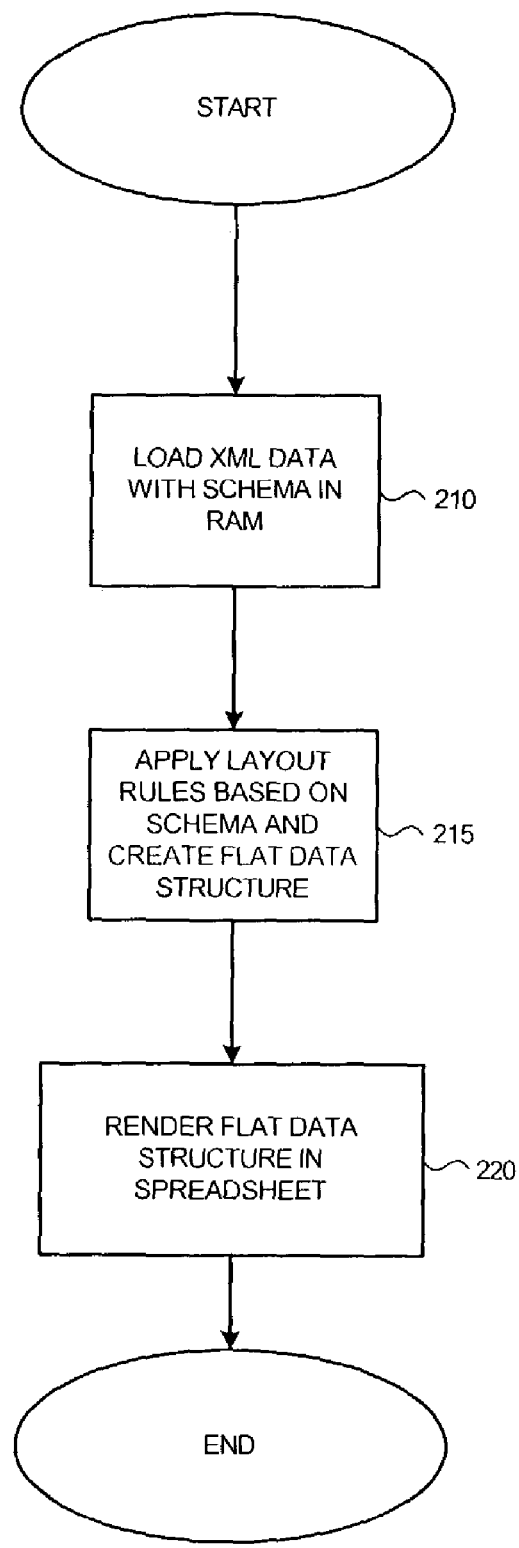
FIG. 2 illustrates an operational flow for converting XML data into a flat data structure based on input XML schema data according to an embodiment of the present invention.

FIG. 2 shows illustrative logical operations performed by the XML flattening program module 36 for converting the input XML data 37 into the flat data structure 39 based on the input XML schema data 38 in the personal computer system 20 described above. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The logical operations begin at load operation 210 where the input XML data 37 containing hierarchical data is loaded into a memory such as the RAM 25 for use by an application program, such as a spreadsheet application program. The input XML data 37 may include a schema embedded in the data which defines the parent-child relationships between XML elements and attributes appearing in the data. Optionally, the input XML data 37 may include a pointer to the input XML schema data 38 which may be stored on the personal computer system 20 or on a remote computer (such as remote computer 49) accessible by the personal computer system 20 over the network interface 53. It will be appreciated that the schema in the input XML schema data 38 is "mapped" to the flat data structure 39 in the application program so that the rows and columns of the spreadsheet correspond to the defined hierarchical relationships. The schema may be mapped by a user (i.e., by dragging and dropping schema elements into the spreadsheet) or alternatively, the mapping may be performed automatically by the spreadsheet application program. The "mapped" schema is associated with the data in the input XML data 37 once it is loaded into the application program.

Figure 3:
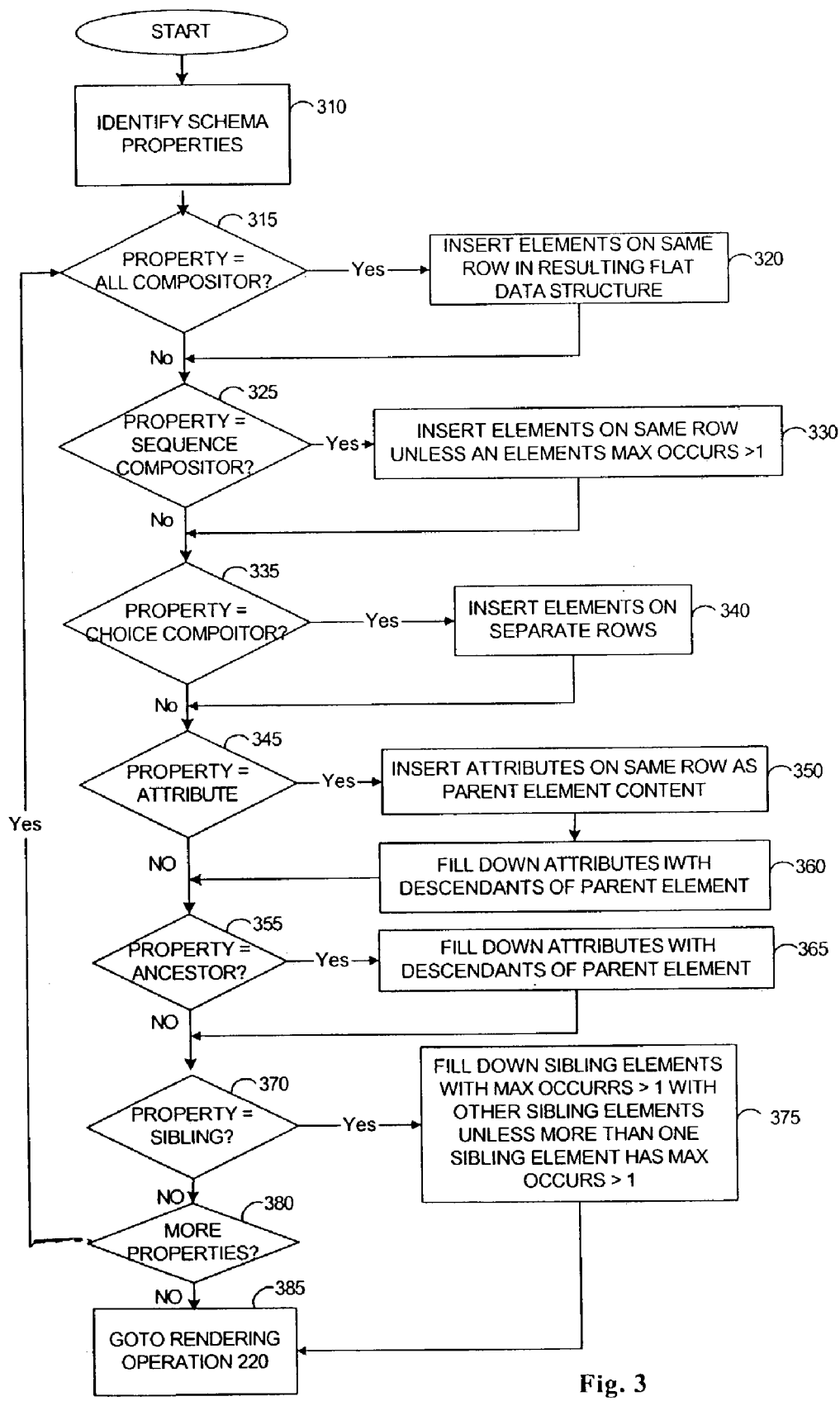
FIG. 3 illustrates an operational flow for applying layout rules to XML data according to various embodiments of the present invention.

Next, the operational flow continues to application operation 215 where the XML flattening program module 36 determines how the loaded XML data is to be inserted based on constructs within the schema which has been mapped to the spreadsheet. The XML flattening program module 36 makes its determination by applying a series of "layout rules" to the data. The layout rules are based on known schema constructs and govern how the data is to be inserted or "flattened." It will also be appreciated that the XML flattening program module 36 may flatten the entire input XML data 37 or a fragment of the data. The XML flattening program module 36 flattens fragments from the beginning of the fragment, considering the closest common parent of all the nodes of the fragment. After applying the layout rules, the XML flattening program module 36 creates the flat data structure. The steps comprising application operation 215 are shown in FIG. 3 and will be described in greater detail below. Finally, the operational flow continues to rendering operation 220 where the XML flattening program module 36 renders the "flattened" XML data in the spreadsheet. Illustrative screenshots showing how the data is rendered in the spreadsheet based on the layout rules is shown in FIGS. 4–11 and will be described in greater detail below.

FIG. 3 illustrates an operational flow for depicting the steps of application operation 215 from FIG. 2 in which the layout rules are applied to the loaded XML data by the XML flattening program module 36, based on the schema mapped to the spreadsheet. The operational flow begins at identification operation 310 where the XML flattening program module 36 identifies properties and element types defined in the schema. The properties and element types and their associated layout rules are summarized below:

Properties

All: This property specifies that elements may occur in any order, but may only occur once. If the schema contains an All property, the XML flattening program module 36 will display the elements within this property on the same row in the spreadsheet.

Sequence: This property specifies that elements must occur in the specified order and may occur zero to more than once. The sequence itself may also occur any number of times. If the schema contains a Sequence property, the XML flattening program module 36 will display the elements within this property on the same row in the spreadsheet unless the schema defines an element as occurring more than once.

Choice: This property specifies that elements do not share a relationship with each other and must be chosen (only one occurrence per choice). The chosen element, or group may occur zero to more than once. The choice itself may also occur more than once. If the schema contains a Choice property, the XML flattening program module 36 will display the elements within this compositor on separate rows in the spreadsheet.

Element Types

Attribute: Attributes are equivalent to child elements in a schema. If the schema contains an attribute, the XML flattening program module 36 will display the attributes on the same row as its parent element in the spreadsheet. The XML flattening program module 36 will also "fill down" attributes with other child elements defined in the schema.

Ancestor: Elements having descendants (such as child) are ancestor elements. The XML flattening program module 36 will "fill down" ancestor elements with their descendants.

Sibling: Two or more elements having a common parent are sibling elements. The XML flattening program module 36 will "fill down" sibling elements with other sibling elements unless one or more sibling elements occurs more than once.

As used in this description and the accompanying claims, the term "fill down" is defined as the act of repeating a data value in a table. Thus, even though the data may appear only once in the XML data, it will be displayed more than once in the table. It should be understood that the All, Sequence, and Choice properties are also known as compositors. As is known to those skilled in the art, compositors are XML schema constructs which identify the occurrence requirements or expectations of an element's immediate descendants. Members within the same compositor are considered siblings. At step 315, the XML flattening program module 36 reviews the schema to determine if it contains an All compositor. If the schema contains an All compositor, the XML flattening program module 36 will insert the elements within this compositor on the same row in the resulting flat data structure at step 320. If the schema does not contain an All compositor, the XML flattening program module 36 determines if the schema contains a Sequence compositor at step 325.

An example of an input XML schema data 38 defining elements within an All compositor and a conforming input XML data 37 is shown below:

Schema Data

```
<xsd:element name="root">
    <xsd:complexType>
        <xsd:sequence>
            <xsd:element name="A" maxOccurs="unbounded">
                <xsd:complexType>
                    <xsd:all>
                        <xsd:element name="B" type="xsd:string" />
                        <xsd:element name="C" type="xsd:string" />
                        <xsd:element name="D" type="xsd:string" />
                        <xsd:element name="E" type="xsd:string" />
                    </xsd:all>
                </xsd:complexType>
            </xsd:element>
        </xsd:sequence>
    </xsd:complexType>
</xsd:element>
```

Data

```
<root>
    <A>
        <B>b1</B>
        <C>c1</C>
        <D>d1</D>
        <E>e1</E>
    </A>
    <A>
        <C>c2</C>
        <B>b2</B>
        <E>e2</E>
        <D>d2</D>
    </A>
</root>
```

The input XML schema data 38 illustrated in the above example defines a base element "A" of the XML data structure. Elements "B," "C," "D," and "E" are elements which must be contained within the element "A" and are defined within the All compositor. The "b1," "c1," "d1," and "e1" in the input XML data 37 for the schema represent the data contained within the elements "B," "C," "D," and "E." The "</B>, </C>, </D>, and </E>following the aforementioned data signifies the end of each element. Similarly, the input XML data 37 also indicates "C," "B," "E" and "D" elements containing data "c2," "b2," "e2," and "d2" respectively, also contained within the element "A."

Figure 4:
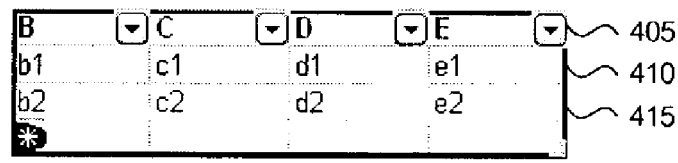
FIG. 4 is a screenshot illustrating a flat data structure resulting from converted XML data according to an illustrative embodiment of the present invention.

An illustrative resulting flat data structure 39 for the data in the input XML data 37 in the above example is shown in FIG. 4. As shown on line 405 in FIG. 4, the column headings represent the elements "B," "C," "D," and "E" defined within the All compositor in the input XML schema data 38. On line 410, the "b1," "c1," "d1," and "e1" data is displayed on the same row. Similarly, on line 415, the "b2," "c2," "d2," and "e2" data is also displayed in the same row. As briefly described above the All compositor specifies that elements may be displayed in any order. Thus, it will be appreciated that the order in which the elements displayed may be different from that shown in FIG. 4.

Returning now to FIG. 3, the XML flattening program module 36 reviews the schema to determine if it contains a Sequence compositor at step 325. If the schema contains a Sequence compositor, the XML flattening program module 36 will insert the elements within this compositor on the same row at step 330 as shown in FIG. 4 above for the All compositor, unless the schema defines an element as occurring more than once. If the schema does not contain a Sequence compositor, the XML flattening program module 36 determines if the schema contains a Choice compositor at step 335.

An example of an input XML schema data 38 defining elements within a Sequence compositor and conforming input XML data 37 is shown below:

Schema Data

```
<xsd:element name="root">
    <xsd:complexType>
        <xsd:sequence>
            <xsd:element name="A" maxOccurs="unbounded">
                <xsd:complexType>
                    <xsd:sequence maxOccurs="unbounded">
                        <xsd:element name="B" type="xsd:string" />
                        <xsd:element name="C" type="xsd:string" />
                        <xsd:element name="D" type="xsd:string" />
                        <xsd:element name="E" type="xsd:string" />
                    </xsd:sequence>
                </xsd:complexType>
            </xsd:element>
        </xsd:sequence>
    </xsd:complexType>
</xsd:element>
```

Data

```
<root>
    <A>
        <B>b1</B>
        <C>c1</C>
        <D>d1</D>
        <E>e1</E>
        <B>b2</B>
        <C>c2</C>
        <D>d2</D>
        <E>e2</E>
    </A>
</root>
```

The input XML schema data 38 illustrated in the above example defines elements "B," "C," "D," and "E" as unbounded elements (i.e., maxOccurs="unbounded") within the Sequence compositor indicating that the data contained within these elements must occur in the specified order and that each element may occur more than once.

Figure 5:
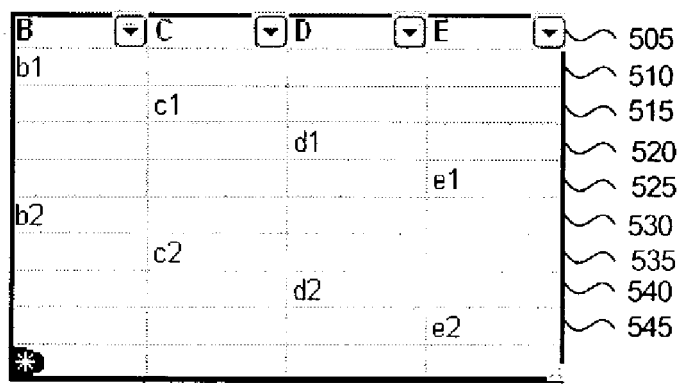
FIG. 5 is a screenshot illustrating a flat data structure resulting from converted XML data according to an illustrative embodiment of the present invention.

An illustrative resulting flat data structure 39 for the data in the input XML data 37 for the unbounded sequence in the above example is shown in FIG. 5. As shown on line 505 in FIG. 5, the column headings represent the elements "B," "C," "D," and "E" defined within the Sequence compositor in the input XML schema data 38. On lines 510–525, the "b1," "c1," "d1," and "e1" data are inserted on separate rows. Similarly, on lines 530–545, the "b2," "c2," "d2," and "e2" data are also inserted on separate rows. In an unbounded sequence the children of the sequence can appear any number of times. Thus, there is no apparent relationship between the siblings. For example, in the input XML data file of the example shown in FIG. 5, it is impossible to determine that the data sets "b1," "c1," "d1," and "e1" and b2," "c2," "d2," and "e2" are not related to each other because they have a common parent.

Returning now to FIG. 3, the XML flattening program module 36 reviews the schema to determine if it contains a Choice compositor at step 335. If the schema contains a Choice compositor, the XML flattening program module 36 will insert the elements within this compositor on separate rows at step 340. If the schema does not contain a Choice compositor, the XML flattening program module 36 determines if the schema contains an Attribute property at step 355.

An example of an input XML schema data 38 defining elements within a Choice compositor and a conforming input XML data 37 is shown below:

---

Schema Data

```
<xsd:element name="root">
    <xsd:complexType>
        <xsd:sequence>
            <xsd:element name="A" maxOccurs="unbounded">
                <xsd:complexType>
                    <xsd:choice>
                        <xsd:element name="B" type="xsd:string" />
                        <xsd:element name="C" type="xsd:string" />
                        <xsd:element name="D" type="xsd:string" />
                        <xsd:element name="E" type="xsd:string" />
                    </xsd:choice>
                </xsd:complexType>
            </xsd:element>
        </xsd:sequence>
    </xsd:complexType>
</xsd:element>
```
Data

```
<root>
    <A>
        <E>e1</E>
    </A>
    <A>
        <C>c2</C>
    </A>
    <A>
        <D>d1</D>
    </A>
    <A>
        <B>b1</B>
    </A>
</root>
```

---

The input XML schema data 38 illustrated in the above example defines elements "B," "C," "D," and "E" as choice elements within the Choice compositor <xsd: choice>, indicating that the data contained within these elements do not share a relationship with each other. As a result, the XML flattener program module 36 will insert each element on a separate row in the spreadsheet.

Figure 6:
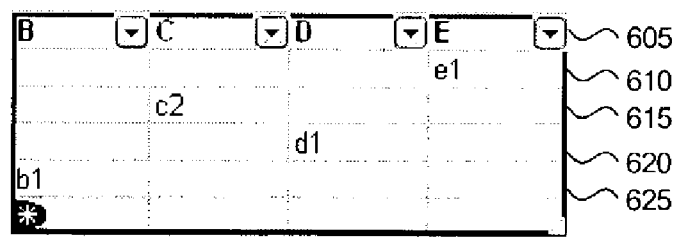
FIG. 6 is a screenshot illustrating a flat data structure resulting from converted XML data according to an illustrative embodiment of the present invention.

An illustrative resulting flat data structure 39 for the data in the input XML data 37 for the above example is shown in FIG. 6. As shown on line 605 in FIG. 6, the column headings represent the elements "B," "C," "D," and "E" defined within the Choice compositor in the input XML schema data 38. On lines 610–625, the "e1," "c2," "d1," and "b1" data are inserted on separate rows.

It should be understood that the input XML schema data 38 may include compositors nested within other compositors. For example, XML schema data may define elements within a Choice compositor which are nested within elements defined within a Sequence compositor. When flattening nested elements, the XML flattening program module 36 inserts the data for each element according to the layout rules for each compositor. An example of input XML schema data 38 defining Choice compositor elements nested within sequence compositor elements and conforming input XML data 37 is shown below:

---

Schema Data

```
<xsd:element name="root">
    <xsd:complexType>
        <xsd:sequence>
            <xsd:element name="A" maxOccurs="unbounded">
                <xsd:complexType>
                    <xsd:sequence>
                        <xsd:element name="B" type="xsd:string" />
                        <xsd:choice>
                            <xsd:element name="C" type="xsd:string" />
                            <xsd:element name="D" type="xsd:string" />
                        </xsd:choice>
                        <xsd:element name="E" type="xsd:string" />
                    </xsd:sequence>
                </xsd:complexType>
            </xsd:element>
        </xsd:sequence>
    </xsd:complexType>
</xsd:element>
```
Data

```
<root>
    <A>
        <B>b1</B>
        <C>c1</C>
        <E>e1</E>
    </A>
    <A>
        <B>b2</B>
        <D>d1</D>
        <E>e2</E>
    </A>
</root>
```

---

The input XML schema data 38 illustrated in the above example defines elements "B" and "E" as Sequence elements indicating that the data contained within these elements must occur in the specified order. The input XML schema data 38 also defines elements "C" and "D" as Choice elements indicating that the data contained within these elements do not share a relationship with each other. Thus, according to the XML schema data 38. elements "B" and "E" may be in sequence with element "C" or element "D." The XML data 37 indicates that the elements "B," "C," and "E" contain the data "b1," "e1," and "e1" respectively. The XML data 37 also indicates that the elements "B," "D," and "E" contain the data "b2," "d1," and "e2." As discussed above, the XML flattener program module 36 inserts data within Sequence elements on the same row in the spreadsheet (unless maxOccurs>1) and inserts data within Choice elements on separate rows in the spreadsheet.

Figure 7:
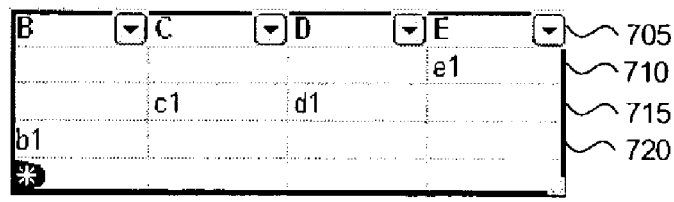
FIG. 7 is a screenshot illustrating a flat data structure resulting from converted XML data according to an illustrative embodiment of the present invention.

An illustrative resulting flat data structure 39 for the data in the conforming input XML data 37 for the above example is shown in FIG. 7. As shown on line 705 in FIG. 7, the column headings represent the elements "B," "C," "D," and "E" defined within the Sequence and Choice compositors in the input XML schema data 38. On line 710, the "b1" and "e1" Sequence data are inserted on the same row as the "c1" Choice data, while on line 715, the "b2" and "e2" Sequence data are also inserted on the same row as the "d1" Choice data. Thus, as shown in FIG. 7, the layout rules for both Sequence and Choice compositors are satisfied. Choice data "c1" and "d1" appear on different rows while Sequence data "b1," "e1," "b2," and "e2" are in sequence with the Choice data.

Returning now to FIG. 3, the XML flattening program module 36 reviews the schema to determine if it defines attributes for the input XML data 37 at step 345. If the schema defines attributes, the XML flattening program module 36 will insert the attributes on the same row as their parent element content at step 350. The XML flattening program module 36 will also "fill down" attributes with the descendants of each parent element (e.g., child elements) defined in the schema at step 360. If the schema does not define attributes, the XML flattening program module 36 determines if the schema defines ancestor elements at step 355.

An example of input XML schema data 38 defining attributes and a conforming input XML data 37 is shown below:

Schema Data

```
<xsd:element name="root">
  <xsd:complexType>
    <xsd:sequence>
      <xsd:element name="A" maxOccurs="unbounded">
        <xsd:complexType>
          <xsd:simpleContent>
            <xsd:restriction base="xsd:string">
              <xsd:attribute name="ATTA" type="xsd:integer" />
            </xsd:restriction>
          </xsd:simpleContent>
        </xsd:complexType>
      </xsd:element>
    </xsd:sequence>
  </xsd:complexType>
</xsd:element>
```

Data

```
<root>
  <A ATTA="1">A1</A>
  <A ATTA="2">A2</A>
  <A ATTA="3">A3</A>
</root>
```

The input XML schema data 38 illustrated in the above example defines the element "A" and the attribute "ATTA" which is further defined as having an integer value (specified in the input XML data as "1," "2," or "3."

Figure 8:
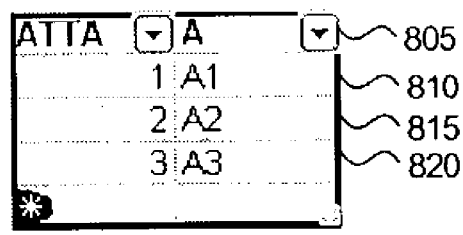
FIG. 8 is a screenshot illustrating a flat data structure resulting from converted XML data according to an illustrative embodiment of the present invention.

An illustrative resulting flat data structure 39 for the data in the input XML data 37 for the above example is shown in FIG. 8. As shown on line 805 in FIG. 8, the column headings represent the attribute "ATTA" and the parent element "A" defined in the input XML schema data 38. On lines 810–820, the integer attribute values "1," "2," and "3" are inserted are each inserted on the same row as parent element "A" data "A1," "A2," and "A3."

Another example of input XML schema data 38 defining attributes and conforming input XML data 37 is shown below:

Schema Data

```
<xsd:element name="root">
  <xsd:complexType>
    <xsd:sequence>
      <xsd:element name="A" maxOccurs="unbounded">
        <xsd:complexType>
          <xsd:sequence>
            <xsd:element name="B">
              <xsd:complexType>
                <xsd:sequence>
                  <xsd:element name="C" type="xsd:string" />
                  <xsd:element name="D" type="xsd:string" />
                </xsd:sequence>
              </xsd:complexType>
            </xsd:element>
          </xsd:sequence>
          <xsd:attribute name="ATTA" type="xsd:integer" />
        </xsd:complexType>
      </xsd:element>
    </xsd:sequence>
  </xsd:complexType>
</xsd:element>
```

Data

```
<root>
  <A ATTA="213">
    <B>
      <C>C1</C>
      <D>D1</D>
    </B>
    <B>
      <C>C2</C>
      <D>D2</D>
    </B>
  </A>
</root>
```

The input XML schema data 38 illustrated in the above example defines the attribute "ATTA" (having an integer value of "213") with the parent element "A" as well as child elements "C" and "D" within the element "B."

Figure 9:
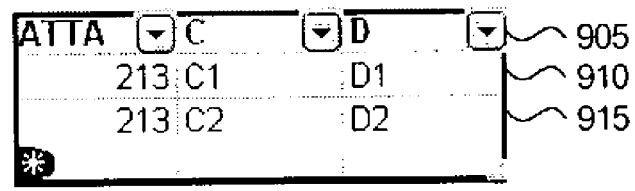
FIG. 9 is a screenshot illustrating a flat data structure resulting from converted XML data according to an illustrative embodiment of the present invention.

An illustrative resulting flat data structure 39 for the data in the input XML data 37 for the above example is shown in FIG. 9. As shown on line 905 in FIG. 9, the column headings represent the attribute "ATTA" and the repeating child elements "C" and "D." The data for repeating child elements "C" and "D" are inserted on lines 910 and 915. The data value "213" for the attribute "ATTA" is also inserted alongside the data for child elements "C" and "D" on lines 910 and 915. Thus, the data for the attribute "ATTA" which does not repeat is filled down with the data for the repeating child elements "C" and "D."

Returning now to FIG. 3, the XML flattening program module 36 reviews the schema to determine if it defines ancestor elements for the input XML data 37 at step 355. If the schema defines ancestor elements, the XML flattening program module 36 will "fill down" the ancestor elements with their descendants at step 365. If the schema does not define ancestor elements, the XML flattening program module 36 determines if the schema defines sibling elements at step 370.

An example of an input XML schema data 38 defining ancestor elements and a conforming input XML data 37 is shown below:

Schema Data

```
<xsd:element name="root">
    <xsd:complexType>
        <xsd:sequence>
            <xsd:element name="A" maxOccurs="unbounded">
                <xsd:sequence>
                    <xsd:element name="B" type="xsd:string" max/>
                </xsd:sequence>
            </xsd:element>
            <xsd:element name="C" type="xsd:string" />
        </xsd:sequence>
    </xsd:complexType>
</xsd:element>
```

Data

```
<root>
    <A>
        <B>B1</B>
    </A>
    <A>
        <B>B2</B>
    </A>
    <C>C1</C>
</root>
```

The input XML schema data 38 illustrated in the above example specifies that element "C" is an ancestor of element "B." In the input XML data 37, element "B" contains the data "B1" and "B2," while the element "C" contains the content "C1."

Figure 10:
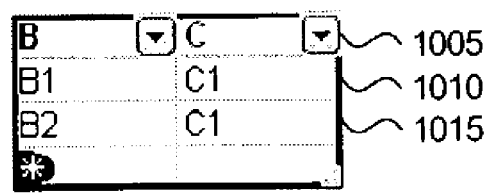
FIG. 10 is a screenshot illustrating a flat data structure resulting from converted XML data according to an illustrative embodiment of the present invention.
Figure 11:
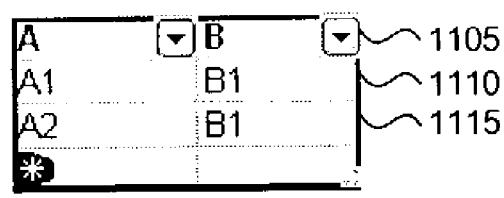
FIG. 11 is a screenshot illustrating a flat data structure resulting from converted XML data according to an illustrative embodiment of the present invention.

An illustrative resulting flat data structure 39 for the data in the input XML data 37 for the above example is shown in FIG. 10. As shown on line 1005 in FIG. 10, the column headings represent the elements "B" and "C." The data for repeating element "B" is inserted on lines 1010 and 1015. The data for ancestor element "C" "fills down" along with the data for element "B."

Returning now to FIG. 3, the XML flattening program module 36 reviews the schema to determine if it defines sibling elements for the input XML data 37 at step 370. If the schema defines sibling elements, the XML flattening program module 36 XML flattening program module 36 will "fill down" sibling elements with other sibling elements unless one or more sibling elements occurs more than once. If the schema does not define sibling elements, the operative flow continues to step 380 where the XML flattening program module 36 returns to the schema to determine if there are any more properties. If there are more properties defined in the schema, the operative flow returns to step 315 where the XML flattening program module 36 determines the identity of the next property. If there are no more properties defined in the schema, the operative flow returns to the rendering operation 220 in FIG. 2.

An example of an input XML schema data 38 defining sibling elements and a conforming input XML data 37 is shown below:

Schema Data

```
<xsd:element name="root">
    <xsd:complexType>
        <xsd:sequence>
            <xsd:element name="A" maxOccurs="unbounded"/>
```

-continued

```
            <xsd:element name="B" type="xsd:string" />
        </xsd:sequence>
    </xsd:complexType>
</xsd:element>
```

Data

```
<root>
    <A>A1</A>
    <A>A2</A>
    <B>B1</B>
</root>
```

The input XML schema data 38 illustrated in the above example specifies that elements "A" and "B" are siblings. In the input XML data 37, element "A" contains the data "A1" and "A2," while the element "B" contains the content "B1."

An illustrative resulting flat data structure 39 for the data in the input XML data 37 for the above example is shown in FIG. 12. As shown on line 1105 in FIG. 11, the column headings represent the elements "A" and "B." The data for repeating element "A" is inserted on lines 1110 and 1115. The data for sibling element "B" "fills down" along with the data for element "A."

It should be understood that when two or more sibling elements, ancestor elements, or ancestor sibling elements are defined as occurring more than once in a schema, a Cartesian product is created. Cartesian products are the result of elements being combined into several combinations without any defined meaning. For example, if a sibling elements "A" and "B" are both defined in a schema as unbounded (i.e., occurring more than once), any number of element "As" would have to be inserted with any number of element "Bs." Cartesian products are often undesirable because they typically result in very large data sets. For example, given two columns of data each with "m" and "n" rows, a Cartesian product would result when the "m" rows are multiplied by the "n" rows of data. This could lead to very huge datasets as the number of rows and the number of columns increase. Furthermore, it is difficult to determine the relationships of data in Cartesian products resulting in huge data sets especially since the data sets might not have originally been related at all. As a result, the XML flattener program module 36 does not "fill down" these elements.

In view of the foregoing, it will be appreciated that the present invention provides a method and system for converting a hierarchical data structure into a flat data structure based on a schema. While the invention has been particularly shown and described with reference to illustrative embodiments thereof, it will be understood by those skilled in the art that various other changes in the form and details may be made therein without departing from the spirit and scope of the invention.

What is claimed is:

1. A computer-implemented method for converting a hierarchical data structure into a flat data structure comprising:

in an application program, loading hierarchical data conforming to a schema wherein the hierarchical data includes elements and attributes linked together in a parent-child relationship, wherein the schema defines hierarchical relationships between the elements and attributes;

applying a plurality of layout rules to the hierarchical data based on the schema to create the flat data structure; and rendering the hierarchical data so that the hierarchical data is inserted in rows and columns in the flat data structure, wherein applying a plurality of layout rules to the hierarchical data based on the schema comprises: identifying properties in the schema, wherein the properties identify occurrence requirements for the elements defined in the schema; and applying the plurality of layout rules based on the identified properties, wherein the properties include a first property specifying: the order in which the elements occur in the hierarchical data; and the minimum and maximum number of times that each element may occur in the hierarchical data, wherein the first property is a sequence compositor or an all compositor, wherein the hierarchical data is XML data, wherein the application program is a spreadsheet application program, wherein the flat data structure is readily usable by an electronic spreadsheet.

2. The method of claim 1, wherein the properties include a second property specifying the minimum and maximum number of times that chosen elements may occur in the hierarchical data.

3. The method of claim 2, wherein the second property is a choice compositor.

4. The method of claim 1, wherein the layout rules include inserting each element on the same row within the flat data structure according to the first property.

5. The method of claim 1, wherein the layout rules include inserting each element on a separate row within the flat data structure according to the first property if the maximum number of occurrences of each element is greater than one.

6. The method of claim 2, wherein the layout rules include inserting each chosen element on a separate row within the flat data structure according to the second property.

7. The method of claim 1, wherein the layout rules include inserting each attribute within the flat data structure.

8. The method of claim 1, wherein the layout rules include inserting each attribute on the same row as the content of its parent element within the flat data structure.

9. The method of claim 1, wherein the layout rules include inserting each attribute on the same row as the content of its parent element within the flat data structure for each and every occurrence of the content according.

10. The method of claim 1, wherein the hierarchical data includes ancestor elements and sibling elements.

11. The method of claim 10, wherein the layout rules include inserting ancestor elements on the same row as their descendants within the flat data structure for each and every occurrence of the descendants.

12. The method of claim 10, wherein the layout rules include inserting sibling elements on the same row for each sibling occurring more than once.

13. The method of claim 10, wherein the layout rules include inserting each sibling element on a separate row within the flat data structure according if the maximum number of occurrences of a plurality of the sibling elements is greater than one.

14. A computer-readable medium having computer-executable instructions for executing the method of claim 1.

15. A computer system for converting a hierarchical data structure into a flat data structure comprising:

a memory for storing:
the hierarchical data structure, a schema associated with the flat data structure, and the flat data structure; and a processing unit functionally coupled to the memory, for executing computer-executable instructions operable for:

loading the hierarchical data conforming to the schema, wherein the hierarchical data includes elements and attributes linked together in a parent-child relationship, wherein the schema defines hierarchical relationships between the elements and attributes;

identifying properties in the schema, wherein the properties identify occurrence requirements for the elements defined in the schema;

applying a plurality of layout rules based on the identified properties to create the flat data structure; and rendering the hierarchical data so that the hierarchical data is inserted in rows and columns in the flat data, wherein the properties include a first property specifying: the order in which the elements occur in the hierarchical data; and the minimum and maximum number of times that each element may occur in the hierarchical data, wherein the first property is a sequence compositor or an all compositor, wherein the hierarchical data is XML data, wherein the application program is a spreadsheet application program, wherein the flat data structure is readily usable by an electronic spreadsheet.

16. The system of claim 15, wherein the properties include a second property specifying the minimum and maximum number of times that chosen elements may occur in the hierarchical data.

17. The system of claim 16, wherein the second property is a choice compositor.

18. The system of claim 15, wherein the layout rules include inserting each element on the same row within the flat data structure according to the first property.

19. The system of claim 15, wherein the layout rules include inserting each element on a separate row within the flat data structure according to the first property if the maximum number of occurrences of each element is greater than one.

20. The system of claim 16, wherein the layout rules include inserting each chosen element on a separate row within the flat data structure according to the second property.

21. The system of claim 15, wherein the layout rules include inserting each element having content within the flat data structure.

22. The system of claim 15, wherein the layout rules include inserting each attribute within the flat data structure.

23. The system of claim 15, wherein the layout rules include inserting each attribute on the same row as the content of its parent element within the flat data structure.

24. The system of claim 15, wherein the layout rules include inserting each attribute on the same row as the content of its parent element within the flat data structure for each and every occurrence of the content.

25. The system of claim 15, wherein the layout rules include inserting ancestor elements on the same row as their descendants within the flat data structure for each and every occurrence of the descendants.

26. The system of claim 15, wherein the layout rules include inserting sibling elements on the same row for each sibling occurring more than once.

* * * * *

UNITED STATES PATENT AND TRADEMARK OFFICE
CERTIFICATE OF CORRECTION

PATENT NO. : 7,003,722 B2  
APPLICATION NO. : 10/376442  
DATED : February 21, 2006  
INVENTOR(S) : Chad Rothschiller et al.

Page 1 of 1

It is certified that error appears in the above-identified patent and that said Letters Patent is hereby corrected as shown below:

On the title page, in item (56), under "Other Publications", in column 1, line 1, delete "Chad Rothchiller" and insert -- Chad Rothschiller --, therefor.

On the title page, in item (56), under "Other Publications", in column 1, line 10, after "6,868,423" delete "B1" and insert -- B2 --, therefor.

On page 2, in item (56), under "Other Publications", in column 1, line 12, delete "DeRosa" and insert -- DeRose --, therefor.

In column 8, line 5, delete "</E>following" and insert -- </E> following --, therefor.

In column 11, line 1, after "data "b1,"" delete ""e1,"" and insert -- "c1," --, therefor.

Signed and Sealed this

Eleventh Day of August, 2009

David J. Kappos
*Director of the United States Patent and Trademark Office*